US008189696B2

(12) United States Patent
Lee et al.

(10) Patent No.: US 8,189,696 B2
(45) Date of Patent: May 29, 2012

(54) ORTHOGONAL FREQUENCY DIVISION MULTIPLEXING COMMUNICATION SYSTEM, MULTI-HOP SYSTEM, RELAY STATION, AND SPATIALLY LAYERED TRANSMISSION MODE

(75) Inventors: Jong-Hyeuk Lee, Anyang-si (KR); Sang-Boh Yun, Seongnam-si (KR); Joo-Hyun Lee, Suwon-si (KR); Dae-Sik Hong, Seoul (KR); Hyung-Joon Song, Seoul (KR)

(73) Assignees: Samsung Electronics Co., Ltd., Suwon-si (KR); Industry-Academic Cooperation Foundation, Seoul (KR)

( * ) Notice: Subject to any disclaimer, the term of this patent is extended or adjusted under 35 U.S.C. 154(b) by 975 days.

(21) Appl. No.: 12/080,650

(22) Filed: Apr. 3, 2008

(65) Prior Publication Data
US 2008/0247478 A1   Oct. 9, 2008

(30) Foreign Application Priority Data

Apr. 3, 2007   (KR) .................. 10-2007-0032979

(51) Int. Cl.
*H04L 27/28* (2006.01)
(52) U.S. Cl. ........ 375/260; 375/259; 375/262; 375/267; 375/295; 375/316; 370/279; 370/311
(58) Field of Classification Search .................. 375/130, 375/35, 147, 259, 260, 262, 295, 299, 312, 375/316, 342, 343, 346, 350
See application file for complete search history.

(56) References Cited

U.S. PATENT DOCUMENTS

| | | | | |
|---|---|---|---|---|
| 7,606,182 | B2 * | 10/2009 | Park et al. ..................... | 370/279 |
| 7,944,985 | B2 * | 5/2011 | ElGamal et al. ............... | 375/267 |
| 2005/0141593 | A1 * | 6/2005 | Pasanen et al. ............... | 375/130 |
| 2006/0276212 | A1 * | 12/2006 | Sampath et al. ............... | 455/513 |
| 2007/0070953 | A1 * | 3/2007 | Yoon et al. ..................... | 370/334 |
| 2008/0014884 | A1 * | 1/2008 | Oyman et al. ............. | 455/187.1 |
| 2008/0123574 | A1 * | 5/2008 | Sandhu et al. ................. | 370/311 |
| 2009/0047898 | A1 * | 2/2009 | Imamura et al. ................. | 455/7 |
| 2009/0061767 | A1 * | 3/2009 | Horiuchi et al. ............... | 455/18 |
| 2011/0090832 | A1 * | 4/2011 | Horiuchi et al. ............... | 370/311 |

FOREIGN PATENT DOCUMENTS

| | | |
|---|---|---|
| KR | 100166635 B1 | 9/1998 |
| KR | 1020050020457 A | 3/2005 |
| KR | 1020060001645 A | 1/2006 |
| KR | 1020060124401 A | 12/2006 |
| WO | WO2006/101013 * | 9/2006 |
| WO | WO 2006/106692 * | 10/2006 |

* cited by examiner

*Primary Examiner* — Hirdepal Singh

(57) ABSTRACT

An apparatus and method for data transmission in an Orthogonal Frequency Division Multiplexing (OFDM) communication system are provided. An OFDM system includes a reference Relay Station (RS) and a cooperative relay station respectively for performing an Spatially Layered transmission Mode (SLM) process by modulating a phase and magnitude of a signal by using a predetermined modulation order suitable for the reference relay station to obtain a spatially-layered signal and for delivering the spatially-layered signal to a target Mobile Station (MS); a Base Station (BS) for selecting the reference relay station and the cooperative relay station among a plurality of relay stations; and an mobile station for detecting data through Maximum Likelihood (ML) detection in which a signal having the largest ML is detected by comparing the received spatially-layered signal with a signal which is converted through the SLM upon receiving the spatially-layered signal from the reference relay station and the cooperative relay station.

21 Claims, 12 Drawing Sheets

ORTHOGONAL FREQUENCY DIVISION MULTIPLEXING COMMUNICATION SYSTEM, MULTI-HOP SYSTEM, RELAY STATION, AND SPATIALLY LAYERED TRANSMISSION MODE

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Apr. 3, 2007 and assigned Serial No. 2007-32979, the entire disclosure of which is hereby incorporated by reference.

TECHNICAL FIELD OF THE INVENTION

The present invention relates to an apparatus and method for data transmission in an Orthogonal Frequency Division Multiplexing (OFDM) communication system. More particularly, the present invention relates to an apparatus and method in which relay stations are used in data transmission so that a signal transmitted from each relay station is modulated into a signal having a different phase and magnitude in an asynchronous multi-hop system and an OFDM or Orthogonal Frequency Division Multiplex Access (OFDMA)-based wireless cellular communication system.

BACKGROUND OF THE INVENTION

In the conventional multi-hop system, a transmission system may be implemented to have a plurality of relay stations as virtual multiple antennas. In this case, unlike a multi-antenna system, data can be effectively received since a decrease in correlation becomes significant due to a large spatial distance between relay stations. However, a time-synchronous error may occur when the relay stations are used as the virtual multiple antennas. Various techniques have conventionally been proposed in order to prevent deterioration caused by the time-synchronous error, and the techniques are divided into a data transmission technique and a data reception technique.

As a representative example of the data reception technique, there is a Minimum Mean Square Error-Decision Feedback Equalizer (MMSE-DFE) method. In the MMSE-DFE method, signals transmitted from a transmitter and relay stations are received by repeating signal processing without using information on a time-synchronous error or multi-fading channel information. With this method, a reception performance is improved since the signals transmitted from the transmitter and the relay stations are simultaneously received, and then a decoding index of each signal is regulated according to an MMSE. That is, a receiver using the MMSE-DFE method can achieve improvement in the reception performance while reducing consumption of resources for synchronization and channel estimation. Disadvantageously, however, cost of the receiver (i.e., mobile station) significantly increases due to a complex structure of the receiver, and real-time signal processing is impossible due to a long signal-processing time. As a result thereof, services cannot be rapidly provided. In addition, a load of signal processing exponentially increases in proportion to the number of relay stations in use, thereby decreasing effectiveness.

Meanwhile, there is a data transmission technique using a Space-Time Block Code (STBC) method. The STBC method uses a frame design by considering a maximum multi-path delay time and a maximum time-synchronous error in a condition where transmission paths between a transmitter and all relay stations have been determined. In the STBC method, signals are transmitted by the transmitter and one RS, and specific relay stations are determined to which the signals are transmitted in each hop. As a result, a diversity gain and a power gain are obtained in a receiving end irrespective of a multi-path channel and a time delay. That is, according to the data transmission technique using the STBC method, the spatial diversity gain and the power gain can be obtained through multi-hop transmission in a multi-path fading channel and a channel having a time-synchronous error. Since information on the multi-path fading channel and a range of the time-synchronous error have to be known for each hop transmission, the STBC method has a demerit in that a data transfer rate significantly decreases in proportion to the number of relay stations in use, thereby deteriorating the entire system efficiency.

Accordingly, there is a need for a data transmission technique in which a target mobile station (MS) for receiving data is robust to a synchronous error without having to estimate time synchronization of signals transmitted from each relay station (RS) in an Orthogonal Frequency Division Multiplexing (OFDM) communication system.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and method for data transmission in an Orthogonal Frequency Division Multiplexing (OFDM) communication system.

Another aspect of the present invention is to provide an apparatus and method for data transmission in which relay stations are used in data transmission so that a signal transmitted from each relay station (RS) is modulated into a signal having a different phase and magnitude in an OFDM communication system.

Another aspect of the present invention is to provide an apparatus and method for data transmission in which a base station (BS) selects two relay stations neighboring to a target mobile station (MS) and transmits data by using the selected two relay stations in an OFDM communication system.

Another aspect of the present invention is to provide an apparatus and method for data transmission in which a relay station performs a Spatially Layered transmission Mode (SLM) process on a received signal by modulating a phase and magnitude of the signal before the signal is transmitted to a target mobile station in an OFDM communication system.

Another aspect of the present invention is to provide an apparatus and method for data transmission in which a mobile station detects data transmitted from a base station by using a spatially-layered signal, which is received from two relay stations and whose phase and magnitude are modulated, in an OFDM communication system.

According to an aspect of the present invention, an OFDM system using an SLM is provided. The OFDM system includes a reference relay station (RS) for performing an SLM process by modulating a phase and magnitude of a signal by using a predetermined modulation order suitable for the reference relay station to obtain a spatially-layered signal and for delivering the spatially-layered signal to a target mobile station; a cooperative relay station for performing the SLM process by modulating a phase and magnitude of a signal by using a predetermined modulation order suitable for the cooperative relay station to obtain a spatially-layered signal and for transmitting the spatially-layered signal to the target mobile station; a base station for selecting the reference relay station and the cooperative relay station among a plurality of relay stations and for transmitting data to the selected reference relay station and the cooperative relay station when there is data to be transmitted; and a mobile station for detecting data through Maximum Likelihood (ML) detection in which a signal having the largest ML is detected by comparing the received spatially-layered signal with a signal which is converted through the SLM after being subjected to a predetermined coding operation, upon receiving the spatially-layered signal from the reference relay station and the cooperative relay station.

According to another aspect of the present invention, a data transmission method of a base station in an OFDM system using an SLM is provided. The method includes, when there is data to be transmitted, generating a search request message for requesting location information of a neighbor mobile station and Channel Quality Information (CQI) and broadcasting the search request message to a plurality of relay stations; receiving a search response message including the location information of the neighbor mobile station and the CQI from the relay stations; selecting two relay stations neighboring to a target mobile station and having good channel quality by using the received search response message; and transmitting the data to the selected relay stations.

According to another aspect of the present invention, a method for an SLM of a relay station in an OFDM system is provided. The method includes, upon receiving a search request message form a base station, requesting neighbor mobile stations to send location information; receiving the location information from the neighbor mobile stations, checking average CQI and thus generating a search response message including the location information and the average CQI, and transmitting the search response message to the base station; when the relay station is selected a reference relay station or a cooperative relay station by the base station, receiving data to be transmitted to a target mobile station from the base station; performing an SLM process by modulating the received data into a signal having a predetermined phase and magnitude suitable for the reference relay station or the cooperative relay station selected by the base station; and transmitting the spatially-layered data to the target mobile station.

According to another aspect of the present invention, a method of receiving a spatially-layered signal in a mobile station of an OFDM system is provided. The method includes, when location information is requested from a relay station, transmitting the location information to the relay station; receiving the spatially-layered signal, whose phase and magnitude are modulated, from a reference relay station and a cooperative relay station; and detecting data transmitted from a base station through ML detection in which a signal having the largest ML is detected by comparing the received spatially-layered signal with a signal which is converted through an SLM after being subjected to a predetermined coding operation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention relates to an apparatus and method in which relay stations are used in data transmission so that a signal transmitted from each relay station (RS) is modulated into a signal having a different phase and magnitude in Orthogonal Frequency Division Multiplexing (OFDM) communication system. Now, the OFDM communication system of the present invention will be described with reference to FIG. 1.

Figure 1:
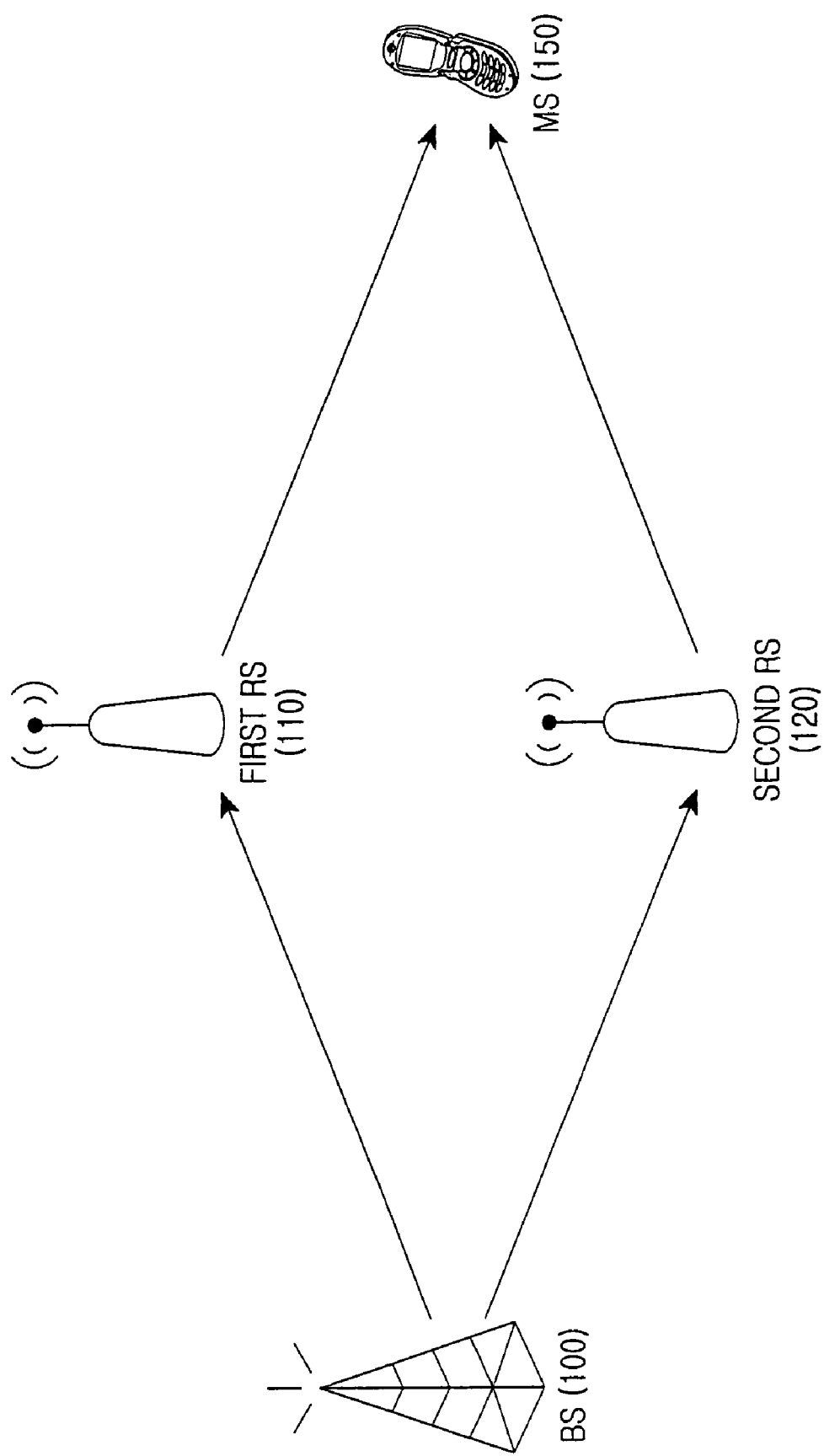
FIG. 1 illustrates a structure of an Orthogonal Frequency Division Multiplexing (OFDM) communication system according to the present invention.

FIG. 1 illustrates a structure of an OFDM communication system according to the present invention. Referring to FIG. 1, the system of the present invention includes a base station (BS) 100, a first relay station (RS) 110, a second RS 120, and a mobile station (MS) 150.

When there is data to be transmitted to the MS 150, the BS 100 generates a search request message for requesting location information of a neighbor MS and broadcasts the search request message to each RS in order to search for relay stations neighboring to the MS 150. Upon receiving a search response message including the location information of the neighbor MS from each RS, the BS 100 selects two relay stations neighboring to the MS 150 by using the location information, determines one of the relay stations 110 and 120 as a reference RS and the remaining RS as a cooperative RS, and transmits the data to be transmitted to the MS 150 via the selected two relay stations 110 and 120. In other words, the BS 100 transmits data streams to be transmitted to one or more MS 150 separately via the two relay stations 110 and 120.

Upon receiving the search request message from the BS 100, the relay stations 110 and 120 examine location information of the neighbor MS and average Channel Quality Information (CQI) with respect to the neighbor MS, generates the search response message including the location information and the CQI, and transmits the search response message to the BS 100. Thereafter, when the relay stations 110 and 120 are selected as the reference RS or the cooperative RS by the BS 100, the data received from the BS 100 is spatially-layered by converting the data into a signal having a phase and magnitude suitable for the selected RS, and the spatially-layered data is transmitted to the MS 150 (hereinafter, such a process will be referred to as a Spatially Layered transmission Mode (SLM) process). In FIG. 1, the first RS 110 is selected as the reference RS, and the second RS 120 is selected as the cooperative RS.

The phase and magnitude of the signal transmitted from the relay stations 110 and 120 is modulated according to Equation 1 below.

$$C_{SLM} = \frac{1}{\sqrt{5}} \begin{bmatrix} s_1\alpha(1+\theta) & s_2\alpha(1+\theta) \\ s_2\gamma\overline{\alpha}(1+\overline{\theta}) & s_1\overline{\alpha}(1+\overline{\theta}) \end{bmatrix}. \quad \text{[Eqn. 1]}$$

In Equation 1, $s_1$ and $s_2$ are data received from the BS prior to modulation, $\theta=(1+\sqrt{5})/2$, $\overline{\theta}=(1+\sqrt{5})/2$, $\alpha=1+i(1-\theta)$, $\overline{\alpha}=1+i(1-\overline{\theta})$, and $\gamma$ is an imaginary unit (i.e., i) representing a unit of imaginary number.

Further, in Equation 1, $\alpha(1+\theta)$ and $\overline{\alpha}(1+\overline{\theta})$ are coefficients for distinguishing signals transmitted from the reference RS and the cooperative RS. The reference RS (i.e., the first RS 110) modulates the received signal by using Equation (2) below and transmits the modulated signal to the MS 150. The cooperative RS (i.e., the second RS 120) modulates the received signal by using Equation 3 below and transmits the modulated signal to the MS 150.

$$C_{SLM} = \frac{1}{\sqrt{5}}[s_1\alpha(1+\theta) \quad s_2\alpha(1+\theta)]. \quad \text{[Eqn. 2]}$$

In Equation 2, $s_1$ and $s_2$ are data received from the BS prior to modulation, $\theta=(1+\sqrt{5})/2$, and $\alpha=1+i(1-\theta)$, where i is an imaginary unit.

$$C_{SLM} = \frac{1}{\sqrt{5}}[s_2\gamma\overline{\alpha}(1+\overline{\theta}) \quad s_1\overline{\alpha}(1+\overline{\theta})]. \quad \text{[Eqn. 3]}$$

In Equation 3, $s_1$ and $s_2$ are data received from the BS prior to modulation, $\overline{\theta}=(1+\sqrt{5})/2$, $\overline{\alpha}=1+i(1-\overline{\theta})$, and $\gamma$ is an imaginary unit (i.e., i) representing a unit of imaginary number.

Figure 2:
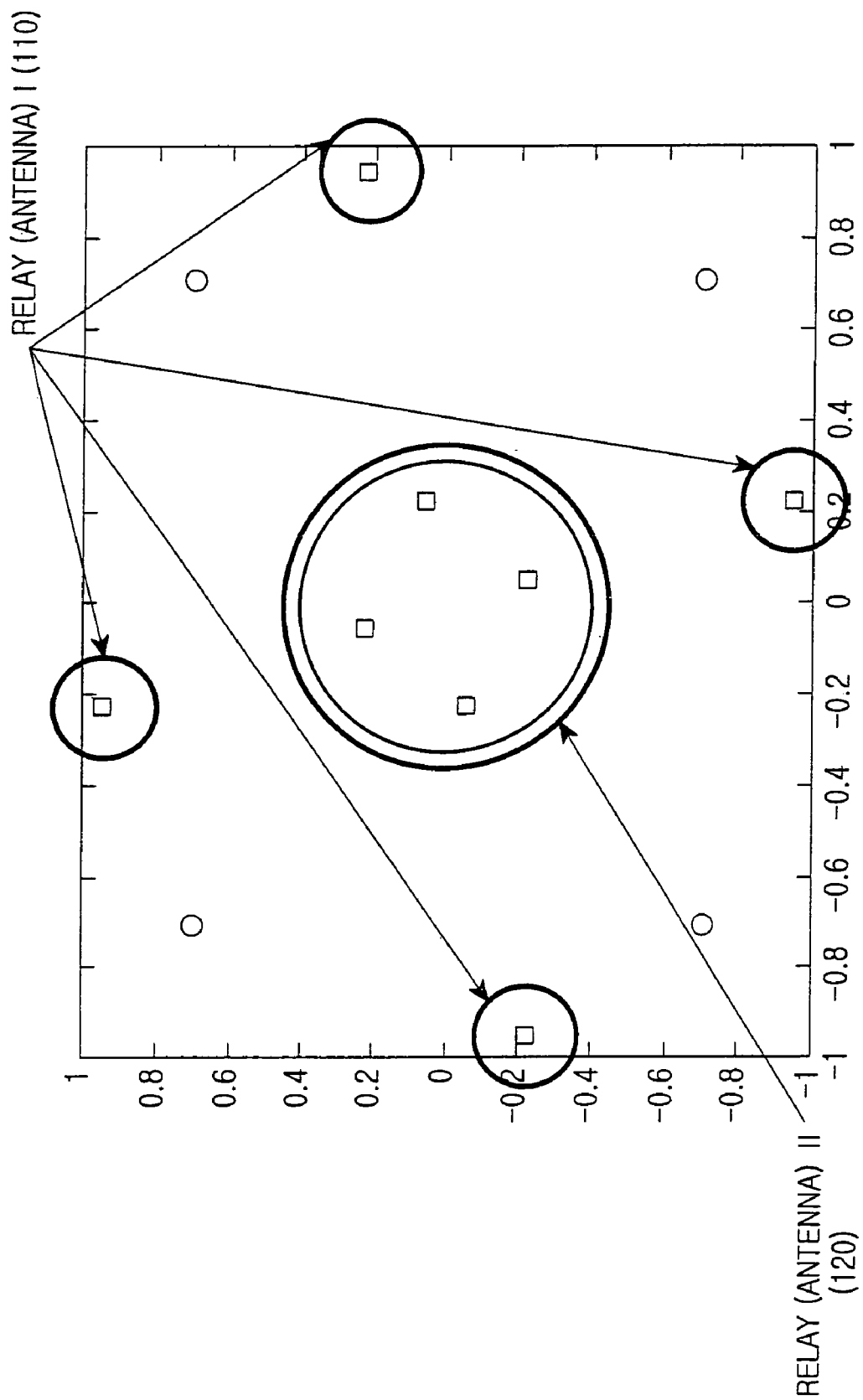
FIG. 2 illustrates a phase of a signal which is spatially layered and is transmitted by each Relay Station (RS) in an OFDM communication system according to the present invention.

Now, a constellation of a Quadrature Phase Shift Keying (QPSK) transmission standard will be described with reference to FIG. 2, in which a signal is divided into a phase component and a magnitude component by the relay stations 110 and 120. FIG. 2 illustrates a phase of a signal which is spatially layered and is transmitted by each RS in an OFDM communication system according to the present invention.

As shown in FIG. 2, the present invention provides an SLM in which a signal to be transmitted from each RS is divided into a phase and a magnitude. The phase and the magnitude are determined by using determination factors of the relay stations 110 and 120. The determination factors are determined by using a design rule which constantly maintains a minimum Euclidean distance between signals by a Space-Time Block Code (STBC) method in order to ensure performance at a high Signal-to-Noise Ratio (SNR). In the design rule, according to a characteristic in which a minimum Euclidean distance determines performance of pair-wise error probability at a high SNR, an STBC for maximizing the performance is determined as an optimal STBC.

The MS 150 receives the spatially-layered signal, whose phase and magnitude are modulated, from the relay stations 110 and 120, and performs Maximum Likelihood (ML) detection by using Equation 4 below. In the ML detection, a signal having the largest ML is detected by comparing the received spatially-layered signal with a signal which is converted through the SLM after being subjected to a predetermined coding operation.

$$\begin{pmatrix} \hat{s}_1 \\ \hat{s}_2 \end{pmatrix} = \min_{s'_1, s'_2} (Y - HC(s'_1, s'_2)). \quad \text{[Eqn. 4]}$$

In Equation 4, $\hat{s}_1$ and $\hat{s}_2$ are detected signals having the largest ML, H is a fading channel matrix between mobile stations, Y is a spatially-layered signal received from the relay stations, and $C(s_1', s_2')$ is a matrix of signals which are converted through the SLM after being subjected to the predetermined coding operation.

Figure 3:
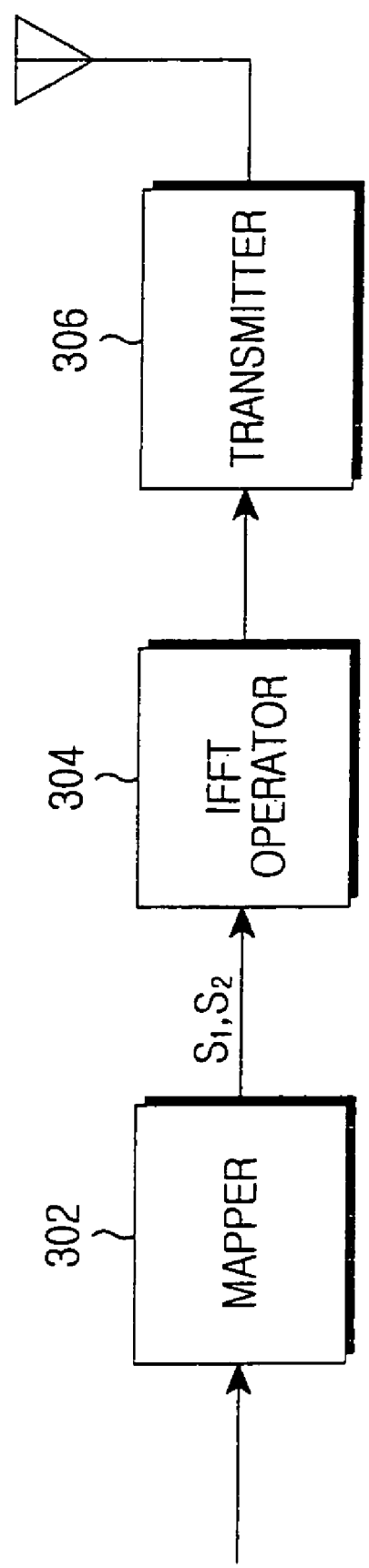
FIG. 3 is a block diagram illustrating a structure of a transmitting end of a Base Station (BS) in an OFDM communication system according to the present invention.

FIG. 3 is a block diagram illustrating a structure of a transmitting end of a BS in an OFDM communication system according to the present invention. Referring to FIG. 3, the transmitting end of the BS 100 includes a mapper 302, an Inverse Fast Fourier Transform (IFFT) operator 304, and a transmitter 306.

Upon receiving data to be transmitted, the mapper 302 maps the data to a sub-carrier and then outputs the data to the IFFT operator 304. The IFFT operator 304 converts the data received from the mapper 302 by performing an IFFT operation. The transmitter 306 converts the digital signal received from the IFFT operator 304 into an analog signal, converts the analog baseband signal to a Radio Frequency (RF) signal so that data transmission is possible in practice, and transmits the RF signal to the reference RS and the cooperative RS which are selected by the BS 100.

Figure 4:
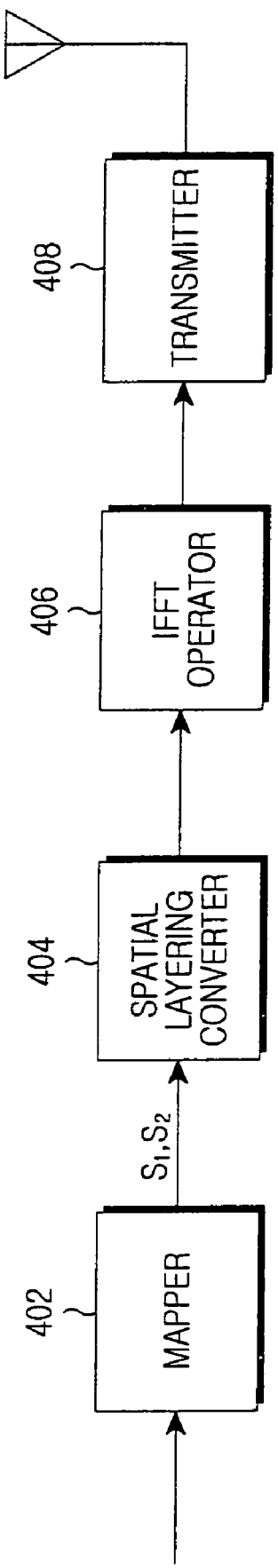
FIG. 4 is a block diagram illustrating a structure of a transmitting end of an RS in an OFDM communication system according to the present invention.

FIG. 4 is a block diagram illustrating a structure of a transmitting end of an RS in an OFDM communication system according to the present invention. Referring to FIG. 4, the relay stations 110 and 120 of the present invention each include a mapper 402, a spatial layering converter 404, an IFFT operator 406, and a transmitter 408.

The mapper 402 maps data received from the BS 100 to a sub-carrier and outputs the resultant data to the spatial layering converter 404. The spatial layering converter 404 performs the aforementioned SLM process so that a phase and magnitude of a received signal are converted into those suitable for a type of RS selected by the BS 100, and outputs the resultant signal to the IFFT operator 406. If the selected RS is the reference RS, the signal is spatially-layered by using Equation (2) above, and if the select RS is the cooperative RS, the signal is spatially-layered by using Equation (3) above.

The IFFT operator 406 performs an IFFT operation on the spatially-layered data received from the spatial layering converter 404. The transmitter 408 converts the digital signal received from the IFFT operator 406 into an analog signal, converts the analog baseband signal to an RF signal so that transmission is possible in practice, and transmits the RF signal to the MS 150.

Figure 5:
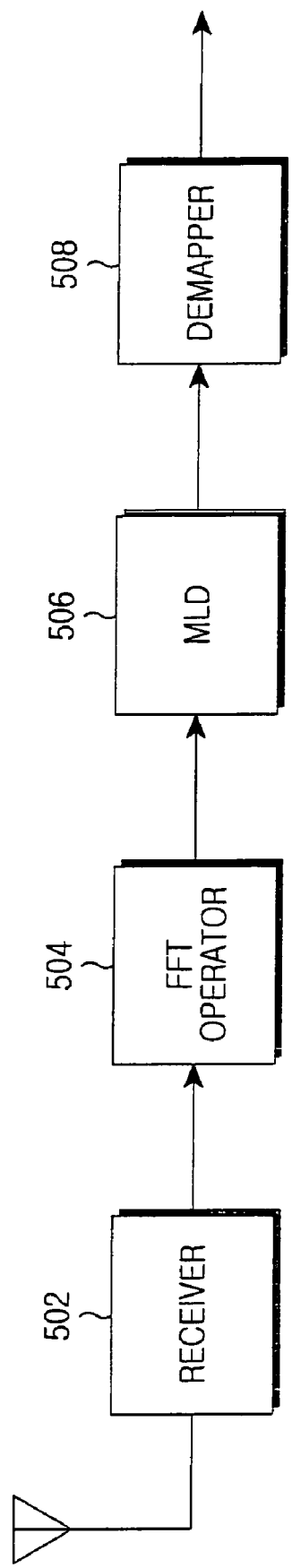
FIG. 5 is a block diagram illustrating a structure of a transmitting end of a Mobile Station (MS) in an OFDM communication system according to the present invention.

FIG. 5 is a block diagram illustrating a structure of a transmitting end of an MS in an OFDM communication system according to the present invention.

Referring to FIG. 5, the MS 150 of the present invention includes a receiver 502, a Fast Fourier Transform (FFT) operator 504, a Maximum Likelihood Detector (MLD) 506, and a demapper 508.

The receiver 502 converts an RF signal received from the relay stations 110 and 120 into a baseband signal, and converts the baseband analog signal into time-domain sample data. The FFT operator 504 performs an FFT operation on the time-domain sample data and thus outputs frequency-domain data.

The MLD 506 performs ML detection by using Equation (4) above. In the ML detection, a signal having the largest ML is detected by comparing the signal received from the MS with a signal which is converted through the SLM after being subjected to a predetermined coding operation. The demapper 508 extracts sub-carrier values for actually carrying data from sub-carrier values included in the signal detected by the MLD 506.

Now, a method of transmitting data using an SLM in an OFDM communication system having the aforementioned structure will be described with reference to the accompanying drawings.

Figure 6:
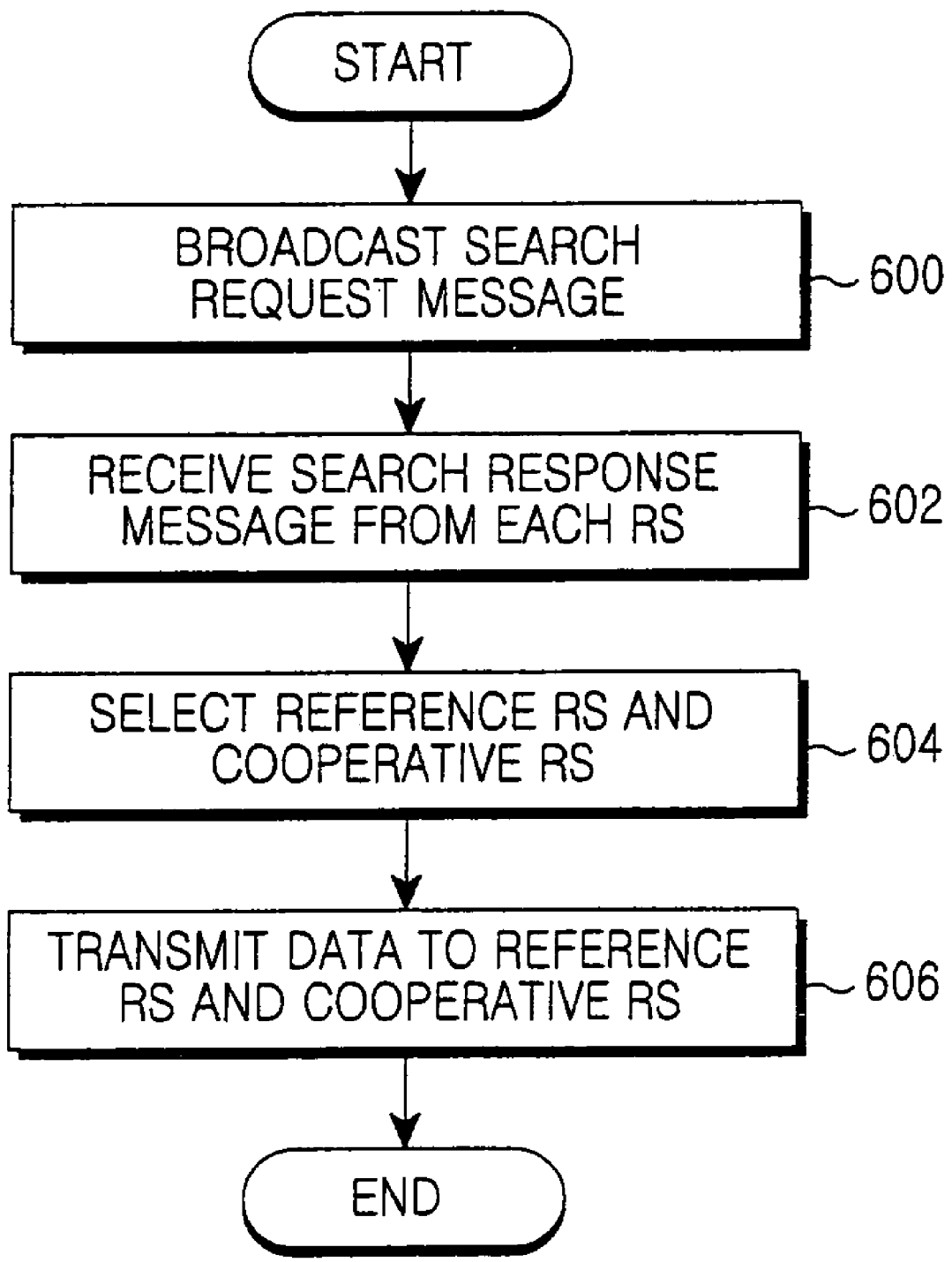
FIG. 6 is a flowchart illustrating a process of transmitting data to an RS in a BS of an OFDM communication system according to the present invention.

FIG. 6 is a flowchart illustrating a process of transmitting data to an RS in a BS of an OFDM communication system according to the present invention. Referring to FIG. 6, when there is data to be transmitted, the BS generates a search request message and broadcasts the search request message to relay stations in step 600. In step 602, the BS receives a search response message including location information of a neighbor MS and CQI from each RS. In step 604, two relay stations neighboring to the MS and having good channel quality are selected by using the received search response message. Between the two relay stations, the RS closer to the MS in location and having better channel quality is selected as a reference RS and the other is selected as a cooperative RS.

In step 606, data is transmitted to the relay stations selected in step 604.

Figure 7:
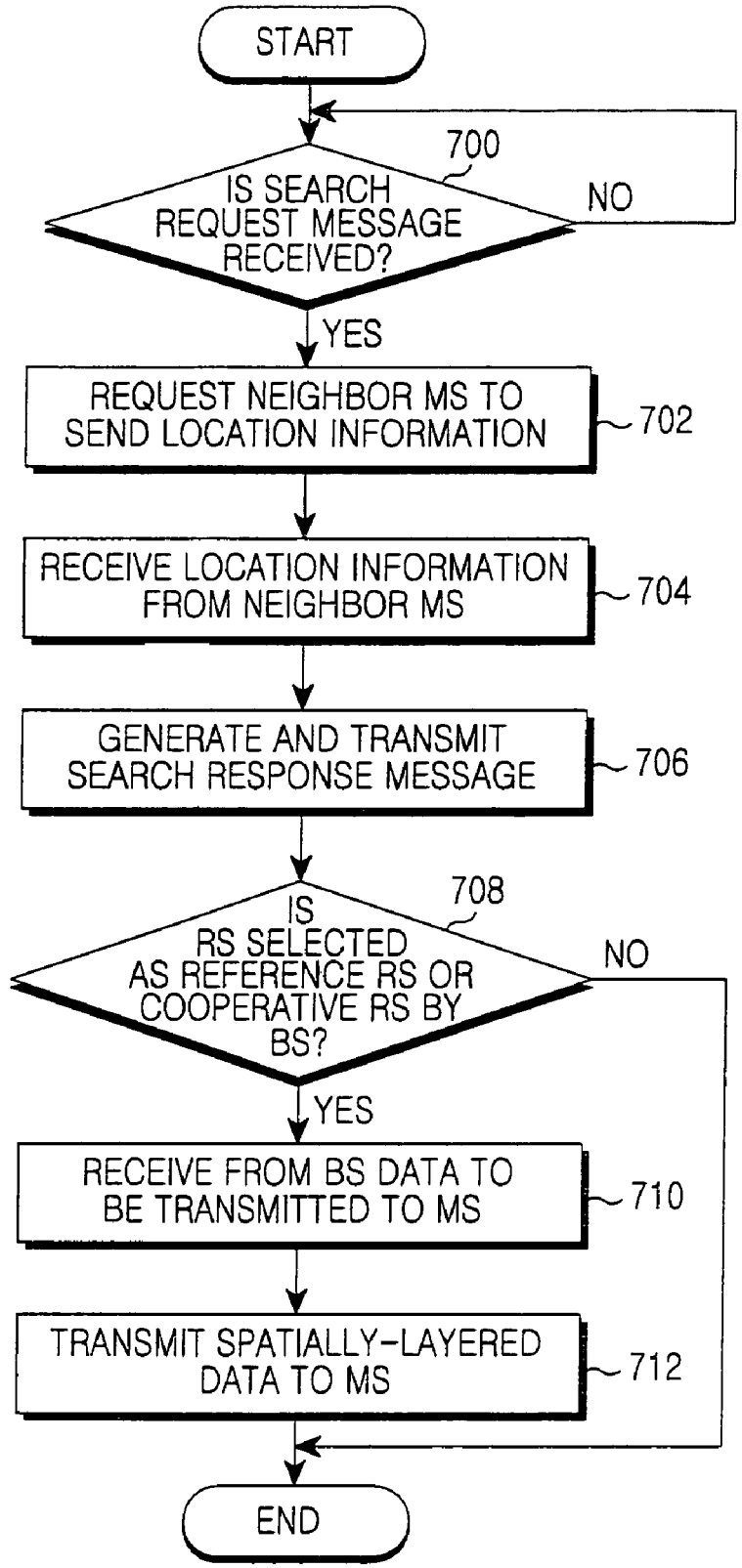
FIG. 7 is a flowchart illustrating a process in which received data is spatially layered and is transmitted to an MS in an RS of an OFDM communication system according to the present invention.

FIG. 7 is a flowchart illustrating a process in which received data is spatially layered and is transmitted to an MS in an RS of an OFDM communication system according to the present invention. Referring to FIG. 7, upon receiving a search request message in step 700, the RS requests neighbor mobile stations to send location information in step 702. In step 704, the location information is received from the neighbor mobile stations. In step 706, the received location information and average CQI are examined to generate a search response message including the location information and the average CQI, and the search response message is transmitted to the BS.

If the RS is selected as a reference RS or a cooperative RS by the BS in step 708, data to be transmitted to a target MS is received from the BS in step 710. In step 712, the received data is spatially layered by converting the data into a signal having a phase and magnitude suitable for the selected RS, and the spatially-layered data is transmitted to the target MS. In this step, if the selected RS is the reference RS, the data is spatially layered by using Equation (2) above, and if the selected RS is the cooperative RS, the data is spatially layered by using Equation (3) above.

Figure 8:
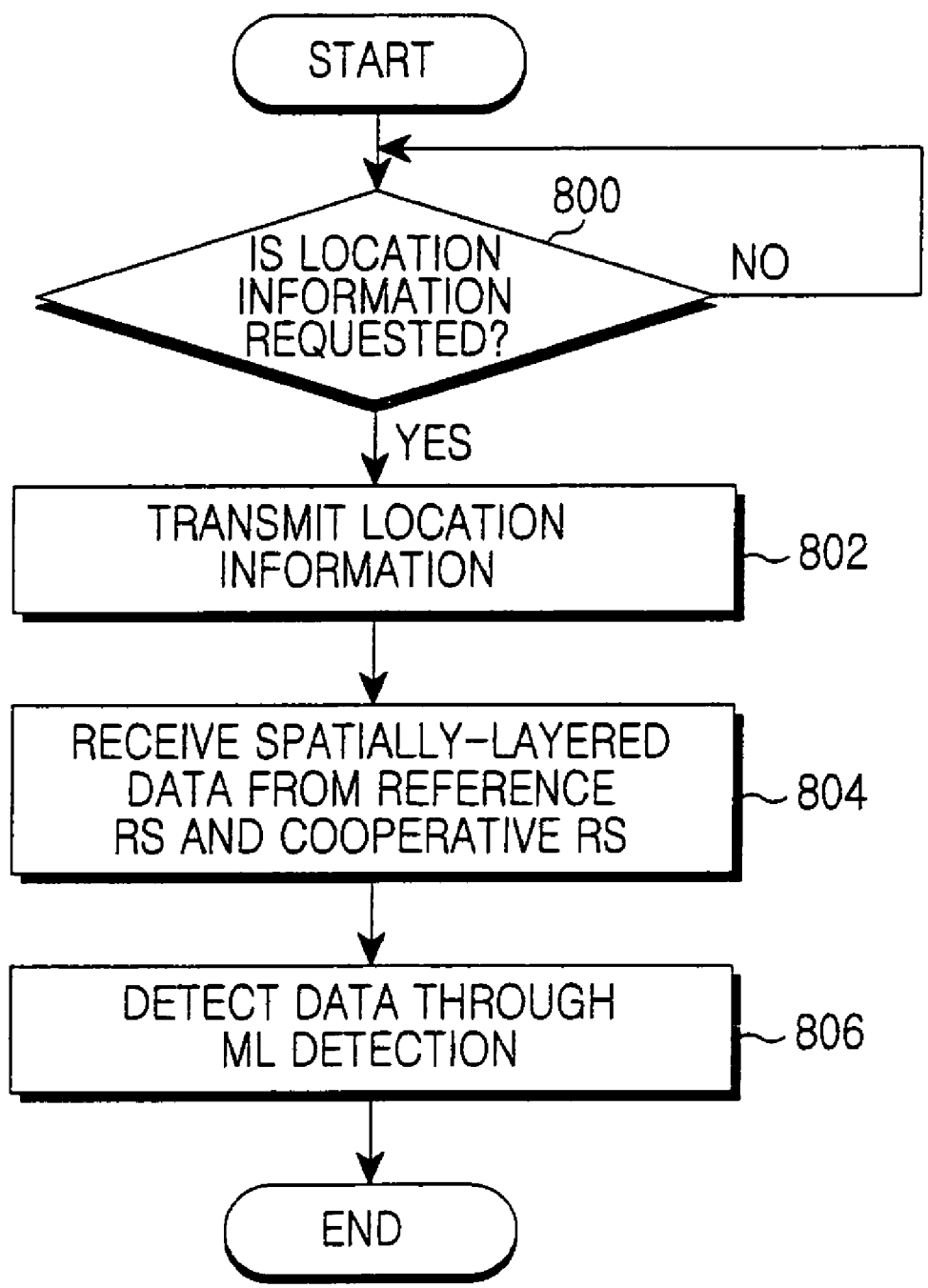
FIG. 8 is a flowchart illustrating a process of detecting data transmitted from a BS by receiving spatially-layered data from an RS in an MS of an OFDM communication system according to the present invention.

FIG. 8 is a flowchart illustrating a process of detecting data transmitted from a BS by receiving spatially-layered data from an RS in an MS of an OFDM communication system according to the present invention. Referring to FIG. 8, when location information is requested from the RS in step 800, a target MS of the present invention transmits the location information to the RS in step 802. In step 804, a spatially-layered signal, whose phase and magnitude are modulated, is received from a reference RS and a cooperative RS. In step 806, the MS performs ML detection in which signals having the largest ML are detected by using Equation (4) above by comparing the received signal with a signal which is converted through the SLM after being subjected to a predetermined coding operation.

Figure 9A:
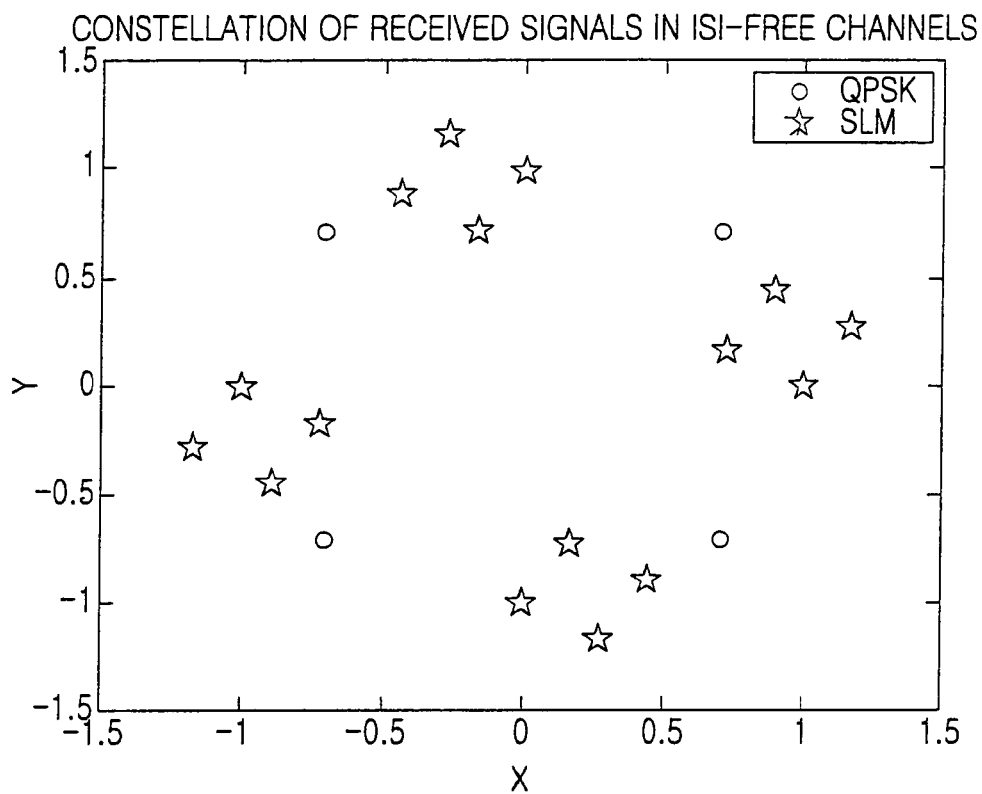
FIGS. 9A and 9B illustrate constellations of a spatially-layered signal received by an MS of an OFDM communication system according to the present invention.
Figure 9B:
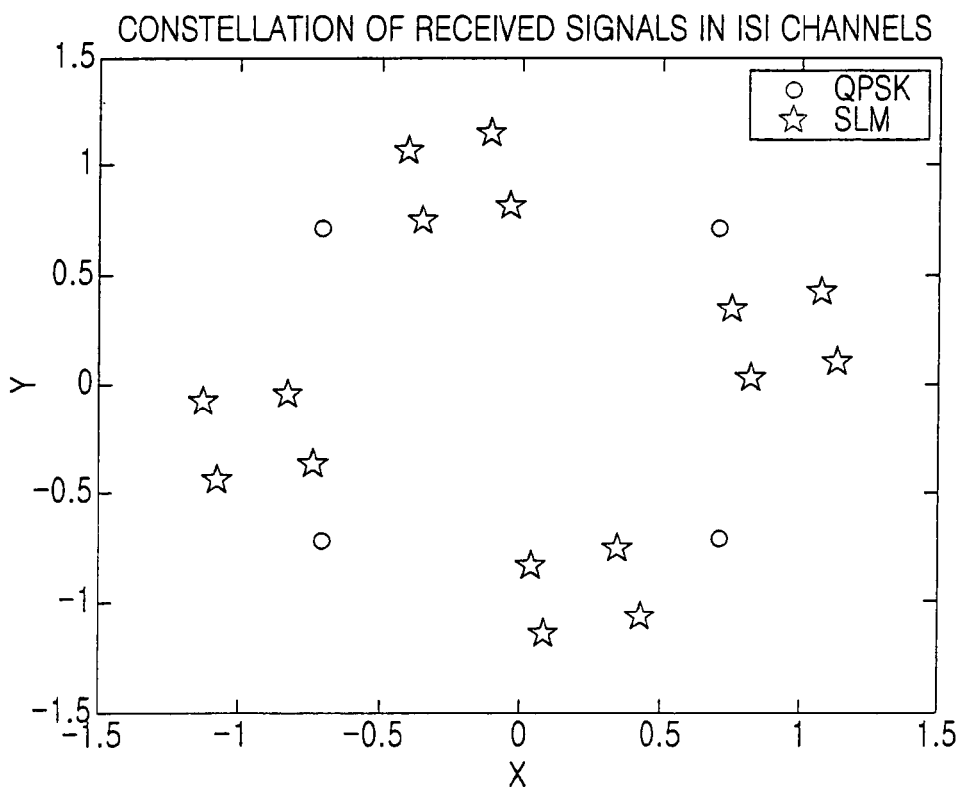

Now, characteristics of a signal received by an MS will be described with reference to FIGS. 9A and 9B. FIGS. 9A and 9B illustrate constellations of a spatially-layered signal received by an MS of an OFDM communication system according to the present invention.

Signals received by the MS from relay stations are linearly summed when received. FIG. 9A shows a constellation of a Receive (Rx) signal when a time-synchronous error ($\Delta$) occurs in a Cyclic Prefix (CP) (i.e., ISI-free channel: $0 \leq \Delta \leq 0.25 \times CP$). As shown in FIG. 9A, in a data reception process, signals transmitted from the relay stations are combined through the SLM. In this case, a minimum Euclidian distance between the Rx signals is maintained to that of a signal transmitted from each RS. Even if a modulation order of a Transmit (Tx) signal increases, a characteristic of the minimum Euclidian distance remains unchanged.

FIG. 9B shows a constellation of an Rx signal when the time-synchronous error ($\Delta$) deviates from the CP (i.e., ISI channel: $-0.25 \times CP \leq \Delta < 0$). As shown in FIG. 9B, only a signal transmitted from an RS is received in a phase-shifted format when the time-synchronous error occurs in a signal in the ISI-free channel. This shows that, in the reception of a signal transmitted through the SLM of the present invention, a minimum Euclidian distance between Rx signals is maintained unlike conventional methods. The characteristic of the minimum Euclidean distance also remains unchanged in an asynchronous channel.

In order to compare performances of the present invention with respect to other data transmission methods, simulations have been conducted in an environment shown in Table 1 below.

TABLE 1

| Number of Sub-Carriers (N) | 64 |
| Cyclic Prefix (CP) | 8 |
| Number of Multiple paths | 4 |
| Synchronous Error Range | −2~2 |

In order to examine an influence of an asynchronous multi-hop system, it has been assumed that a time-synchronous error occurs in the range of −25% to +25% with respect to a CP of an OFDM(A) system, which has been set on the basis of a synchronous error range in an Institute of Electrical and Electronics Engineers (IEEE) 802.16 OFDM(A) uplink model. Since a Full-Rate Full-Diversity (FRFD) STBC, such as Damem and Golden codes, has a data rate twice as high as that of Alamouti and the SLM of the present invention, the FRFD STBC uses QPSK, and the Alamouti and the SLM use 16-Quadrature Amplitude Modulation (QAM) in order to achieve the same throughput. Now, performance comparison results will be described with reference to FIGS. 10A and 10B to FIG. 12.

Figure 10A:
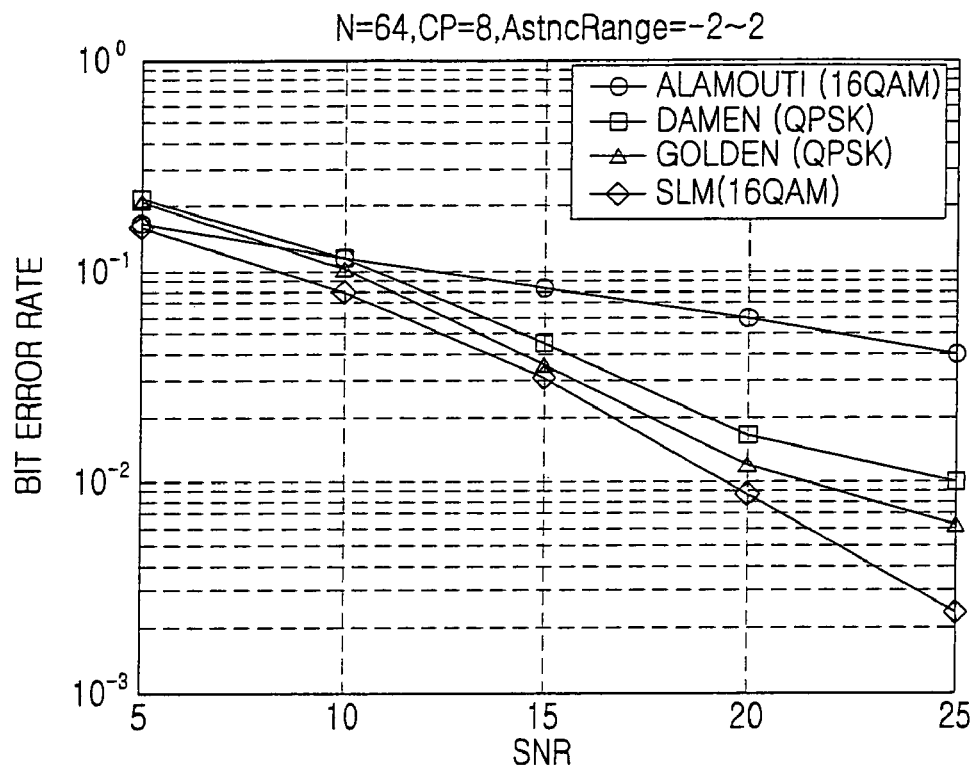
FIGS. 10A and 10B are graphs for illustrating a Bit Error Rate (BER) performance of a data transmission method according to the present invention in comparison with conventional data transmission methods in an OFDM communication system.
Figure 10B:
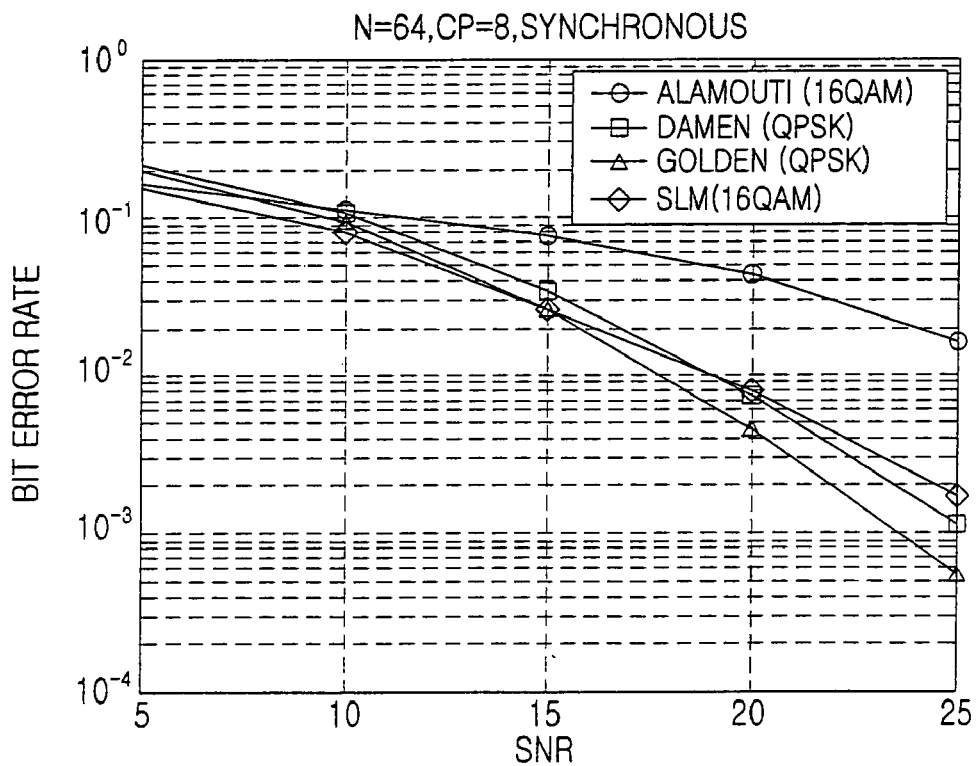

FIGS. 10A and 10B are graphs for illustrating a Bit Error Rate (BER) performance of a data transmission method according to the present invention in comparison with conventional data transmission methods in an OFDM communication system.

FIG. 10A shows a comparison result of a BER performance in an asynchronous multi-hop OFDM(A) system. In the case of the Alamouti, significant performance deterioration is observed because of noise resulted from a high modulation order and also because a linear detection method does not allow data to be received through ML detection in an asynchronous environment. In the case of FRFD STBCs, performance deterioration is small when SNR is less than 20 dB. However, when SNR is equal to or greater than 20 dB, a minimum Euclidean distance cannot be maintained due to a phase-shift caused by Inter-Symbol Interference (ISI), which leads to an error floor. If an MS is not able to receive data through ML detection, significant performance deterioration occurs due to the ISI and Inter-Carrier Interference (ICI) which occur in an asynchronous channel since the minimum Euclidian distance cannot be maintained in the conventional methods. Unlike this, according to the SLM of the present invention, the minimum Euclidian distance can be maintained and thus a reception performance becomes robust to the ISI and ICI. Therefore, the SLM of the present invention shows performance which is robust to interference and noise at low SNR. Further, errors caused by interference can be reduced at a high SNR.

FIG. 10B shows a comparison result of a BER performance in a synchronous channel in which a synchronous error occurs only in a CP in the absence of ISI. The SLM of the present invention shows higher performance at a low SNR region highly affected by noise, but shows worse performance than the conventional FRFD STBCs at a high SNR region. The reason is that the high SNR region is susceptible to noise since a high modulation order is used at the high SNR region while the FRFD STBCs are optimized to this environment.

Figure 11:
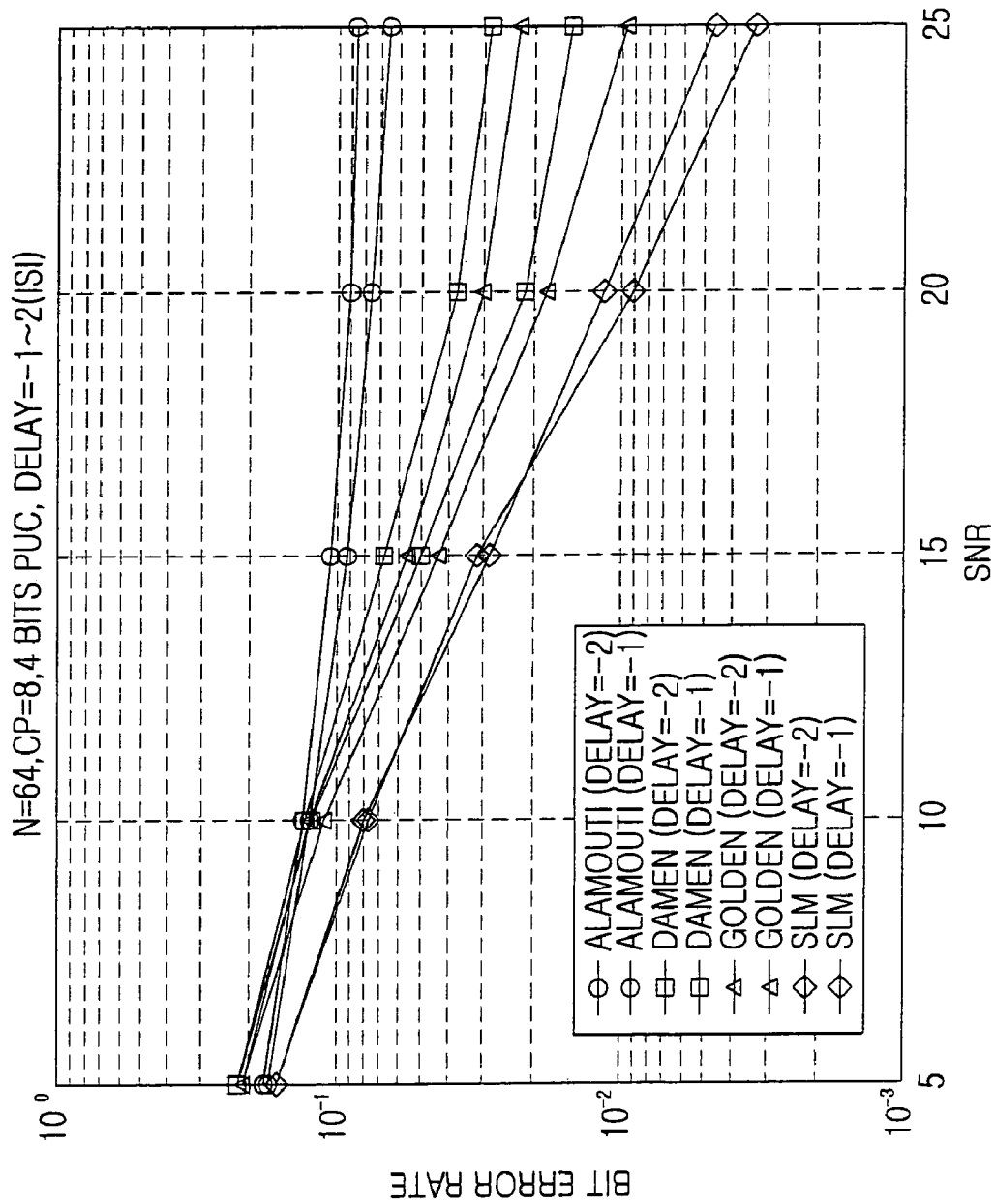
FIG. 11 is a graph for illustrating a BER performance of a data transmission method according to the present invention in comparison with conventional data transmission methods with respect to Inter-Symbol Interference (ISI) in an OFDM communication system.

FIG. 11 is a graph for illustrating a BER performance of a data transmission method according to the present invention in comparison with conventional data transmission methods with respect to ISI in an OFDM communication system. Referring to FIG. 11, a comparison result of a BER performance is shown with respect to ISI. Although the BER performance is good in a channel without ISI similarly to FIG. 10B, performance deterioration is observed when using the FRFD STBC and the Alamouti in the channel without ISI because of significant channel influence. On the contrary, the SLM of the present invention shows less performance deterioration.

Figure 12:
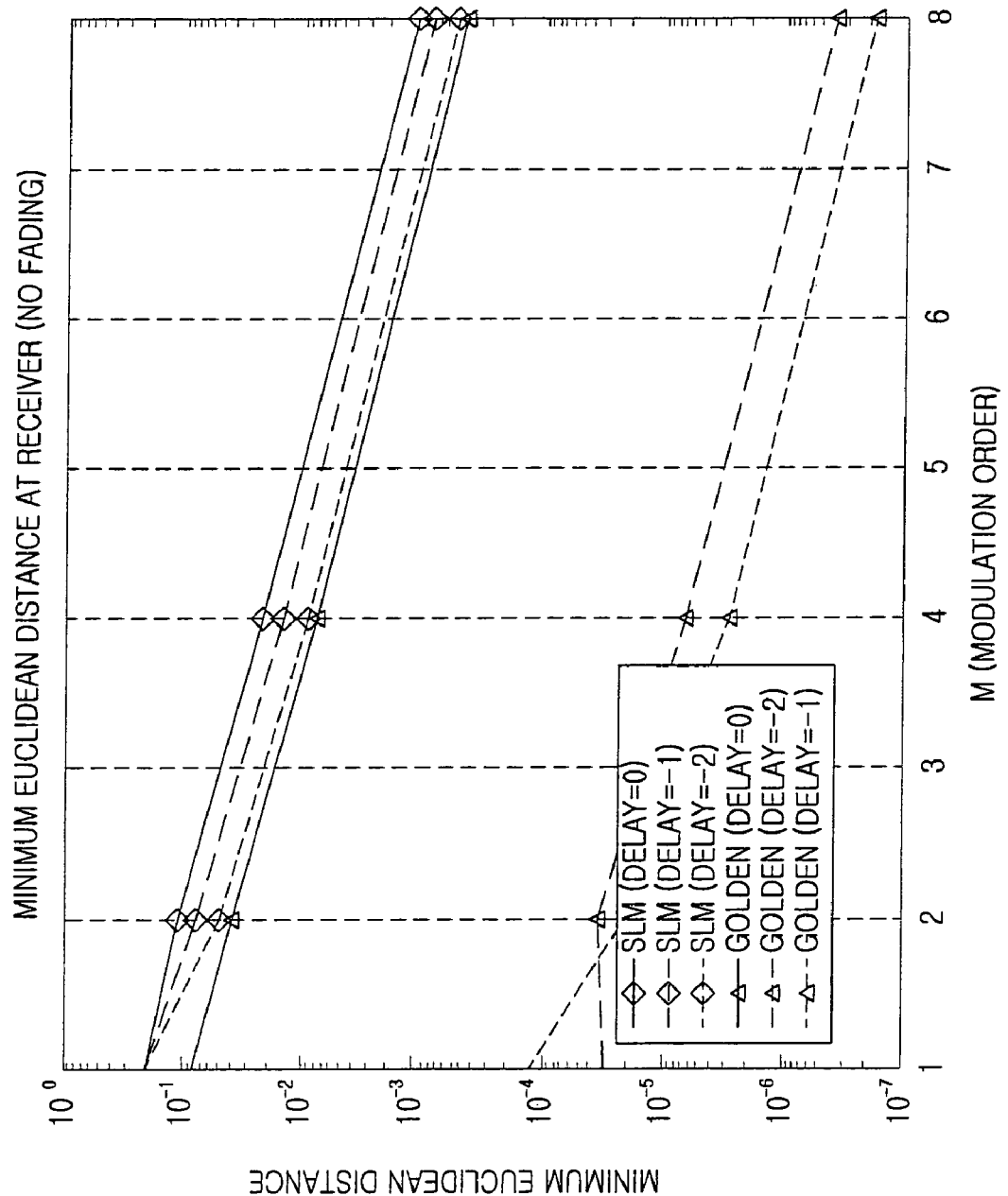
FIG. 12 is a graph for illustrating a BER performance of a data transmission method according to the present invention in comparison with conventional data transmission methods with respect to a modulation order in an OFDM communication system.

FIG. 12 is a graph for illustrating a BER performance of a data transmission method according to the present invention in comparison with conventional data transmission methods with respect to a modulation order in an OFDM communication system. Referring to FIG. 12, a minimum Euclidian distance is shown while modifying a modulation order M to 1 (Binary Phase Shift Keying (BPSK)), 2 (QPSK), 4 (16-QAM), and 8 (256-QAM) according to the SLM of the present invention in comparison with the conventional Golden code method. In the case of the Golden code method, the minimum Euclidean distance decreases by less than $1/1000$ when ISI occurs (Delay=−1, −2) in comparison with the case when ISI does not occur (Delay=0). Unlike this, according to the SLM of the present invention, the minimum Euclidean distance decreases by less than $1/2$. Therefore, when the Golden code method is used, there are changes in characteristics of a signal structure in an ISI environment, thereby being susceptible to interference and noise. As a result, an error performance decreases. On the contrary, the SLM of the present invention is robust to ISI because influence of interference and noise is negligible.

According to the present invention, an apparatus and method are provided in which two relay stations are selected in data transmission so that a signal transmitted from each RS is modulated into a signal having a different phase and magnitude in an OFDM communication system. Therefore, the present invention is robust to a synchronous error.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An Orthogonal Frequency Division Multiplexing (OFDM) system using a Spatially Layered transmission Mode (SLM), the system comprising:

a reference relay station configured to perform an SLM process by modulating a phase and magnitude of a signal by using a predetermined modulation order suitable for the reference relay station to obtain a spatially-layered signal and configured to transmit the spatially-layered signal to a mobile station;

a cooperative relay station configured to perform the SLM process by modulating a phase and magnitude of a signal by using a predetermined modulation order suitable for the cooperative relay station to obtain a spatially-layered signal and configured to transmit the spatially-layered signal to the target mobile station;

a base station configured to select the reference relay station and the cooperative relay station among a plurality of relay stations and configured to transmit data to the selected reference relay station and the cooperative relay station; and the mobile station configured to detect data through Maximum Likelihood (ML) detection in which a signal having the largest ML is detected by comparing the received spatially-layered signal with a signal which is converted through the SLM after being subjected to a predetermined coding operation, upon receiving the spatially-layered signal from the reference relay station and the cooperative relay station, wherein the reference relay station and the cooperative relay station are selected according to a distance from the mobile station to each relay station and a channel quality between the mobile station and each relay station, wherein the base station selects the reference relay station closest in distance to the mobile station and having a best channel quality, and selects the cooperative relay station second closest to the mobile station and having a second best channel quality.

2. The OFDM system of claim 1, wherein, in order to select the reference relay station and the cooperative relay station, the base station generates a search request message for requesting location information of a neighbor mobile station and broadcasts the search request message to the relay stations, receives a search response message including the location information of the neighbor mobile station and average Channel Quality Information (CQI) with respect to the neighbor mobile station from the relay stations, and thus selects the reference relay station and the cooperative relay station by considering a distance from the target mobile station and the average CQI.

3. The OFDM system of claim 2, wherein, when the search request message is received from the base station, the reference relay station and the cooperative relay station generate the search response message including the average CQI with respect to the neighbor mobile station and transmit the search response message to the base station.

4. The OFDM system of claim 1, wherein the reference relay station performs the SLM process by modulating the phase and magnitude of the signal according to the equation:

$$C_{SLM} = \frac{1}{\sqrt{5}}[s_1\alpha(1+\theta) \quad s_2\alpha(1+\theta)],$$

where s1 and s2 are data received from the base station prior to modulation, $\theta=(1+\sqrt{5})/2$, and $\alpha=1+i(1-\theta)$, where i is an imaginary unit.

5. The OFDM system of claim 1, wherein the cooperative relay station performs the SLM process by modulating the phase and magnitude of the signal according to the equation:

$$C_{SLM} = \frac{1}{\sqrt{5}}[s_2\gamma\overline{\alpha}(1+\overline{\theta}) \quad s_1\overline{\alpha}(1+\overline{\theta})],$$

wherein s1 and s2 are data received from the base station prior to modulation, $\overline{\theta}=(1+\sqrt{5})$, $\overline{\alpha}=1+i(1-\theta)$, and $\gamma$ is an imaginary unit (i.e., i) representing a unit of imaginary number.

6. The OFDM system of claim 1, wherein the mobile station performs the ML detection according to the equation:

$$\begin{pmatrix} \hat{s}_1 \\ \hat{s}_2 \end{pmatrix} = \min_{s_1', s_2'} (Y - HC(s_1', s_2')),$$

where $\hat{s}_1$ and $\hat{s}_2$ are the detected signals having the largest ML, H is a fading channel matrix between mobile stations, Y is the spatially-layered signal received from the relay stations, and $C(s_1', s_2')$ is a matrix of signals which are converted through the SLM after being subjected to the predetermined coding operation.

7. A data transmission method of a base station in an Orthogonal Frequency Division Multiplexing (OFDM) system using a Spatially Layered transmission Mode (SLM), the method comprising:

when there is data to be transmitted, generating a search request message for requesting location information of a neighbor mobile station and Channel Quality Information (CQI) and broadcasting the search request message to a plurality of relay stations;

receiving the search response message including the location information of the neighbor mobile station and the CQI from the plurality of relay stations;

selecting at least two relay stations neighboring a target mobile station and having good channel quality by using the received search response message; and transmitting the data to the selected relay stations, wherein the at least two relay stations are selected according to a distance from the target mobile station to each relay station and a channel quality between the mobile station and each relay station, wherein, in selecting at least two relay stations, a relay station closest in distance to the target mobile station and having a best channel quality is selected as a reference relay station, and a relay station second closest to the target mobile station and having a second best channel quality is selected as a cooperative relay station.

8. A method for a Spatially Layered transmission Mode (SLM) of a relay station in an Orthogonal Frequency Division Multiplexing (OFDM) system, the method comprising:

upon receiving a search request message from a base station, requesting neighbor mobile stations to send location information;

receiving the location information from the neighbor mobile stations, determining an average Channel Quality Information (CQI), generating a search response message including the location information and the average CQI, and transmitting the search response message to the base station;

when the relay station is selected a reference relay station or a cooperative relay station by the base station, receiving data to be transmitted to a target mobile station from the base station;

performing an SLM process by modulating the received data into a signal having a predetermined phase and magnitude suitable for the relay station; and transmitting the spatially-layered data to the target mobile station, wherein the reference relay station and the cooperative relay station are selected according to a distance from the target mobile station to each relay station and a channel quality between the mobile station and each relay station, wherein the base station selects the reference relay station closest in distance to the target mobile station and having a best channel quality, and selects the cooperative relay station second closest to the target mobile station and having a second best channel quality.

9. The method of claim 8, wherein, in the SLM process, when the relay station is selected as the reference relay station, the phase and magnitude of the signal is modulated according to the equation:

$$C_{SLM} = \frac{1}{\sqrt{5}}[s_1\alpha(1+\theta) \quad s_2\alpha(1+\theta)],$$

where s1 and s2 are data received from the base station prior to modulation, $\theta=(1+\sqrt{5})/2$, and $\alpha=1+i(1-\theta)$, where i is an imaginary unit.

10. The method of claim 8, wherein, in the SLM process, when the relay station is selected as the reference relay station, the phase and magnitude of the signal is modulated according to the equation:

$$C_{SLM} = \frac{1}{\sqrt{5}}[s_2\gamma\overline{\alpha}(1+\overline{\theta}) \quad s_1\overline{\alpha}(1+\overline{\theta})],$$

wherein s1 and s2 are data received from the base station prior to modulation, $\overline{\theta}=(1+\sqrt{5})/2$, $\overline{\alpha}=1+i(1-\theta)$, and γ is an imaginary unit (i.e., i) representing a unit of imaginary number.

11. A method of receiving a spatially-layered signal in a mobile station of an Orthogonal Frequency Division Multiplexing (OFDM) system, the method comprising:
when location information is requested from a relay station, transmitting the location information to the relay station;
receiving the spatially-layered signal, whose phase and magnitude are modulated, from a reference relay station and a cooperative relay station; and
detecting data transmitted from a base station through Maximum Likelihood (ML) detection in which a signal having the largest ML is detected by comparing the received spatially-layered signal with a signal which is converted through a Spatially Layered transmission Mode (SLM) after being subjected to a predetermined coding operation,
wherein the reference relay station and the cooperative relay station are selected according to a distance from the mobile station to each relay station and a channel quality between the mobile station and each relay station,
wherein the base station selects the reference relay station closest in distance to the mobile station and having a best channel quality, and selects the cooperative relay station second closest to the mobile station and having a second best channel quality.

12. The method of claim 11, wherein the ML detection is performed according to the equation:

$$\begin{pmatrix}\hat{s}_1 \\ \hat{s}_2\end{pmatrix} = \min_{s_1', s_2'}(Y - HC(s_1', s_2'))$$

where $\hat{s}_1$ and $\hat{s}_2$ are the detected signals having the largest ML, H is a fading channel matrix between mobile stations, Y is the spatially-layered signal received from the relay stations, and $C(s_1', s_2')$ is a matrix of signals which are converted through the SLM after being subjected to a predetermined coding operation.

13. A data transmission method in an Orthogonal Frequency Division Multiplexing (OFDM) system using a Spatially Layered transmission Mode (SLM), the method comprising:
generating a search request message for requesting location information of a mobile station;
receiving a search response message from two or more relay stations;
selecting a reference relay station and a cooperative relay station from among the two or more relay stations; and
transmitting data to the reference relay station and the cooperative relay station,
wherein the reference relay station and the cooperative relay station are selected according to a distance from a corresponding mobile station to each relay station and a channel quality between the mobile station and each relay station,
wherein, among the two or more relay stations, a relay station closest in distance to the mobile station and having a best channel quality is selected as a reference relay station, and a relay station second closest to the mobile station and having a second best channel quality is selected as a cooperative relay station.

14. A relay method for data transmission in a relay station of an Orthogonal Frequency Division Multiplexing (OFDM) system using a Spatially Layered transmission Mode (SLM), the method comprising:
after receiving a search request message for requesting location information of a mobile station from a base station, requesting the mobile station to send the location information;
after receiving the location information from the mobile station, generating a search response message and transmitting the search response message to the base station; and
when the relay station is selected as a reference relay station or a cooperative relay station by the base station, transmitting data received from the base station to the mobile station according to the SLM,
wherein the reference relay station and the cooperative relay station are selected according to a distance from the mobile station to each relay station and a channel quality between the mobile station and each relay station,
wherein the base station selects the reference relay station closest in distance to the mobile station and having a best channel quality, and selects the cooperative relay station second closest to the mobile station and having a second best channel quality.

15. The relay method of claim 14, wherein, when the relay station is selected as the reference relay station, the phase and magnitude of the signal is spatially layered by modulating according to the equation:

$$C_{SLM} = \frac{1}{\sqrt{5}}[s_1\alpha(1+\theta) \quad s_2\alpha(1+\theta)],$$

where s1 and s2 are data received from the base station prior to modulation, $\theta=(1+\sqrt{5})/2$, and $\alpha=1+i(1-\theta)$, where i is an imaginary unit.

16. The relay method of claim 14, wherein, when the relay station is selected as the reference relay station, the phase and magnitude of the signal is spatially layered by modulating according to the equation:

$$C_{SLM} = \frac{1}{\sqrt{5}}[s_2\gamma\overline{\alpha}(1+\overline{\theta}) \quad s_1\overline{\alpha}(1+\overline{\theta})],$$

wherein s1 and s2 are data received from the base station prior to modulation, $\overline{\theta}=(1+\sqrt{5})/2$, $\overline{\alpha}=1+i(1-\overline{\theta})$, and γ is an imaginary unit (i.e., i) representing a unit of imaginary number.

17. A method of receiving data in a mobile station in an Orthogonal Frequency Division Multiplexing (OFDM) system using a Spatially Layered transmission Mode (SLM), the method comprising:
  receiving a spatially-layered signal from a reference relay station and a cooperative relay station; and
  detecting data through Maximum Likelihood (ML) detection in which a signal having the largest ML is detected by comparing the spatially-layered signal with a signal which is converted through the SLM after being subjected to a predetermined coding operation,
  wherein the reference relay station and the cooperative relay station are selected according to a distance from the mobile station to each relay station and a channel quality between the mobile station and each relay station,
  wherein the reference relay station is closest in distance to the mobile station and has a best channel quality, and the cooperative relay station is second closest to the mobile station and has a second best channel quality.

18. A relay station for data transmission in an Orthogonal Frequency Division Multiplexing (OFDM) system using a Spatially Layered transmission Mode (SLM), the Relay Station comprising:
  a transmitter configured to receive a search request message to request location information of a mobile station from a base station, transmit a request to the mobile station to send the location information, receive the location information from the mobile station, generate a search request message, and transmit the search response message to the base station; and
  a spatial layering converter configured to transmit data received from the base station to a corresponding mobile station according to the SLM when the relay station is selected as a reference relay station or a cooperative relay station by the base station,
  wherein the reference relay station and the cooperative relay station are selected according to a distance from the mobile station to each relay station and a channel quality between the mobile station and each relay station,
  wherein the reference relay station is closest in distance to the mobile station and has a best channel quality, and the cooperative relay station is second closest to the mobile station and has a second best channel quality.

19. The relay station of claim 18, wherein, when the relay station is selected as the reference relay station, the spatial layering converter performs an SLM process by modulating the phase and magnitude of the signal according to the equation:

$$C_{SLM} = \frac{1}{\sqrt{5}}[s_1\alpha(1+\theta) \quad s_2\alpha(1+\theta)],$$

where s1 and s2 are data received from the base station prior to modulation, $\theta=(1+\sqrt{5})/2$, and $\alpha=1+i(1-\theta)$, where i is an imaginary unit.

20. The relay station of claim 18, wherein, when the relay station is selected as the reference relay station, the spatial layering converter performs the SLM process by modulating the phase and magnitude of the signal according to the equation:

$$C_{SLM} = \frac{1}{\sqrt{5}}[s_2\gamma\overline{\alpha}(1+\overline{\theta}) \quad s_1\overline{\alpha}(1+\overline{\theta})],$$

where s1 and s2 are data received from the base station prior to modulation, $\overline{\theta}=(1+\sqrt{5})/2$, $\overline{\alpha}=1+i(1-\overline{\theta})$, and γ is an imaginary unit (i.e., i) representing a unit of imaginary number.

21. A mobile station of an Orthogonal Frequency Division Multiplexing (OFDM) system, the mobile station comprising:
  a receiver configured to receive a spatially-layered signal from a reference relay station and a cooperative relay station; and
  a maximum likelihood detector configured to detect data from a base station through Maximum Likelihood (ML) detection in which a signal having the largest ML is detected by comparing the received spatially-layered signal with a signal which is converted through a Spatially Layered transmission Mode (SLM),
  wherein the reference relay station and the cooperative relay station are selected according to a distance from the mobile station to each relay station and a channel quality between the mobile station and each relay station,
  wherein the base station selects the reference relay station closest in distance to the mobile station and having a best channel quality, and selects the cooperative relay station second closest to the mobile station and having a second best channel quality.

* * * * *